(12) United States Patent
Guardia Giros et al.

(10) Patent No.: US 9,376,328 B2
(45) Date of Patent: Jun. 28, 2016

(54) METHODS OF MAKING FERRITE NANOCRYSTALS (71) Applicant: FONDAZIONE ISTITUTO ITALIANO DI TECNOLOGIA, Genoa (IT)

(72) Inventors: Pablo Guardia Giros, Barcelona (ES); Andreas Riedinger, Sigmaringen (DE); Simone Nitti, Bari (IT); Teresa Pellegrino, Genoa (IT); Liberato Manna, Genoa (IT); Roberto Cingolani, Genoa (IT)

(73) Assignee: FONDAZIONE ISTITUTO ITALIANO DI TECNOLOGIA, Genova (IT)

( * ) Notice: Subject to any disclaimer, the term of this patent is extended or adjusted under 35 U.S.C. 154(b) by 0 days.

(21) Appl. No.: 14/389,770

(22) PCT Filed: Apr. 5, 2013

(86) PCT No.: PCT/IB2013/052736
§ 371 (c)(1),
(2) Date: Oct. 1, 2014

(87) PCT Pub. No.: WO2013/150496
PCT Pub. Date: Oct. 10, 2013

(65) Prior Publication Data
US 2015/0064103 A1 Mar. 5, 2015

(30) Foreign Application Priority Data

Apr. 6, 2012 (IT) .............. TO2012A0306

(51) Int. Cl.
| | | |
|---|---|---|
| *C01G 49/00* | (2006.01) | |
| *C01G 49/02* | (2006.01) | |
| *C01G 45/02* | (2006.01) | |
| *C01G 51/04* | (2006.01) | |
| *C01G 49/06* | (2006.01) | |
| *C01G 49/08* | (2006.01) | |
| *B82Y 30/00* | (2011.01) | |

(52) U.S. Cl.
CPC .............. *C01G 49/02* (2013.01); *B82Y 30/00* (2013.01); *C01G 45/02* (2013.01); *C01G 49/0018* (2013.01); *C01G 49/0072* (2013.01); *C01G 49/06* (2013.01); *C01G 49/08* (2013.01); *C01G 51/04* (2013.01); *C01P 2002/84* (2013.01); *C01P 2002/88* (2013.01); *C01P 2004/04* (2013.01); *C01P 2004/38* (2013.01); *C01P 2004/64* (2013.01)

(58) Field of Classification Search
None
See application file for complete search history.

(56) References Cited

U.S. PATENT DOCUMENTS 6,962,685 B2 * 11/2005 Sun .................. H01F 1/0054
252/62.56
2008/0203351 A1  8/2008 Gao et al.

FOREIGN PATENT DOCUMENTS

EP  2226634 A2   9/2010
EP  2377810 A1  10/2011

OTHER PUBLICATIONS

Pablo Guardia et al., Heating rate influence on the synthesis of iron oxide nanoparticles: the case of decanoic acid, www.rsc.org/chemcomm, Jun. 21, 2010, pp. 6108-6110, 46, DOI: 10.1039/c0cc01179g, The Royal Society of Chemistry 2010.
Rudolf Hergt et al., Magnetic properties of bacterial magnetosomes as potential diagnostic and therapeutic tools, Journal of magnetism and magnetic materials, 293, 2005, pp. 80-86, Elsevier B.V., DOI: 10.1016/j.jmmm.2005.01.047, Germany.
Hrushikesh M. Joshi et al., Effects of Shape and Size of Cobalt Ferrite Nanostructures on Their MRI Contrast and Thermal Activation, J. Phys, Chem. C 2009, 113, pp. 17761-17767, American Chemical Society, Illinois.
Pablo Guardia et al., Controlled Synthesis of Iron Oxide Nanoparticles over a Wide Size Range, Langmuir Article, pubs.acs.org, 2010, 26(8), pp. 5843-5847, American Chemical Society, DOI: 10.1021/la903767e.

* cited by examiner

*Primary Examiner* — Steven Bos
(74) *Attorney, Agent, or Firm* — Robert E. Alderson, Jr.

(57) ABSTRACT

Methods of making iron-based ferrite nanocrystals are provided. In such methods the ferrite may include iron oxides and iron/cobalt or iron/manganese mixed salts. The method may include thermal decomposition of one or more precursors of the ferrite, consisting of an organic salt of the metal or metals constituting the ferrite of interest, comprising the operation of heating a solution comprising said precursor(s) in the presence of a surfactant and of a non-aqueous organic solvent comprising an ether, at temperature sufficient to cause thermal decomposition of said precursor, wherein the solvent may further comprise a saturated or unsaturated, linear or branched aliphatic hydrocarbon, liquid at temperatures above 45° C. and having a boiling point above the boiling point of the ethereal solvent.

13 Claims, 8 Drawing Sheets

| RATE (C/min) | Fe acetylaceto-nate (mmol) | Decanoic acid (mmol) | Dibenzyl ether (mL) | Squalane (mL) | Vacuum time (minutes) | Size (nm) |
|---|---|---|---|---|---|---|
| 7 | 1 | 4 | 3 | 22 | 120 | 100 |
| 7 | 1 | 4 | 5 | 20 | 120 | 38 |
| 7 | 1 | 4 | 7 | 18 | 120 | 30 |
| 7 | 1 | 4 | 9 | 16 | 120 | 26 |
| 7 | 1 | 4 | 15 | 10 | 120 | 22 |
| 7 | 1 | 4 | 18 | 7 | 150 | 18 |
| 7 | 1 | 4 | 20 | 5 | 120 | 18 |

Table 1

FIG. 15

| RATE (C/min) | Fe acetylacetonate (mmol) | Decanoic acid (mmol) | Dibenzyl ether (mL) | Squalane (mL) | Vacuum time (minutes) | Size (nm) |
|---|---|---|---|---|---|---|
| 7 | 1 | 4 | 15 | 10 | 120 | 22 |
| 7 | 1 | 5 | 15 | 10 | 120 | 17 |
| 7 | 1 | 6 | 15 | 10 | 120 | 14 |
| 7 | 1 | 4 | 15 | 10 | 120 | 22 |
| 2.5 | 1 | 4 | 15 | 10 | 120 | 28 |
| 1.6 | 1 | 4 | 15 | 10 | 120 | 31 |

Table 2

Fig. 16

| $\nu$ (kHz) | H (kAm$^{-1}$) | SAR$^{14\,nm}$ (W/g$_{Fe}$) | std. (W/g$_{Fe}$) | SAR$^{19\,nm}$ (W/g$_{Fe}$) | std. (W/g$_{Fe}$) | SAR$^{24\,nm}$ (W/g$_{Fe}$) | std. (W/g$_{Fe}$) |
|---|---|---|---|---|---|---|---|
| 300 | 24 | 600 | 17 | 825 | 25 | 836 | 79 |
| 300 | 20 | 454 | 24 | 765 | 16 | 764 | 36 |
| 300 | 16 | 386 | 19 | 619 | 10 | 649 | 23 |
| 300 | 12 | 319 | 3 | 462 | 20 | 420 | 20 |
| 219 | 24 | 388 | 17 | 657 | 12 | 791 | 21 |
| 219 | 20 | 353 | 9 | 580 | 10 | 683 | 35 |
| 219 | 16 | 292 | 8 | 463 | 12 | 497 | 9 |
| 219 | 12 | 205 | 6 | 328 | 11 | 333 | 17 |
| 105 | 32 | 169 | 8 | 320 | 8 | 421 | 15 |
| 105 | 24 | 153 | 5 | 292 | 1 | 384 | 5 |
| 105 | 20 | 138 | 2 | 261 | 3 | 327 | 9 |
| 105 | 16 | 116 | 3 | 216 | 1 | 258 | 1 |
| 105 | 12 | 92 | 7 | 153 | 6 | 174 | 6 |

Table 3

METHODS OF MAKING FERRITE NANOCRYSTALS

CROSS-REFERENCE TO RELATED APPLICATIONS

This application is a National Phase Application of PCT International Application No. PCT/IB2013/052736, International Filing Date, Apr. 5, 2013, claiming priority to Italian Patent Application No. TO2012A000306, filed Apr. 6, 2012, each of which is hereby incorporated by reference in its entirety.

FIELD OF THE INVENTION

The present invention relates to a method for preparing monodisperse ferrite nanocrystals and for dissolution thereof in polar solvents. The method makes it possible to obtain magnetic nanocrystals of uniform, regular shape in a wide size range, allowing them to be used in various areas of technology. In particular, owing to their magnetic properties and nanometric dimensions, these nanocrystals can be used in biomedical applications, for example as magnetic guides in the administration of drugs and magnetic separation, as contrast agents in magnetic resonance imaging (MRI) and as heat mediators in hyperthermia treatments.

BACKGROUND OF THE INVENTION

Hyperthermia treatment, in particular, is based on the greater sensitivity of tumour cells to temperatures above 41° C. compared to healthy cells. Magnetically mediated hyperthermia is based on the generation of heat by magnetic nanoparticles through exposure of the latter to an oscillating magnetic field. Compared to other methods of hyperthermia, magnetically mediated hyperthermia is one of the less invasive approaches that is more promising in biomedicine, since magnetic nanoparticles can offer a number of advantages: i) the nanometric size of the nanoparticles would allow intravenous injection and transport via the bloodstream to reach tumours that cannot be reached otherwise; ii) the high surface/volume ratio permits functionalization of the surface of the nanoparticles with one or more recognition molecules, ensuring orientation towards specific tumoral tissues; iii) remote heating of the magnetic nanoparticles by applying an external magnetic field limits the heating action just to the zone where the nanoparticles accumulate, minimizing the side-effects of heating.

The heating capacity of the magnetic nanoparticles exposed to an alternating magnetic field is expressed by the specific absorption rate (SAR), which provides a measure of the absorption of energy per unit of mass of the magnetic material when it is exposed to electromagnetic waves. The generation of heat is derived either from hysteresis losses or relaxation processes (Néel or Brown). The SAR values depend on the structure, composition and crystalline quality of the nanoparticles, but also on the frequency (f) and the amplitude of the magnetic field (H) applied during the measurements. For efficient thermal treatment with minimum invasiveness for the patient, it is of fundamental importance to have magnetic nanomaterials that show high SAR values at a low dose of magnetic nanoparticles and at a low frequency and/or amplitude of the magnetic field applied. In this connection, it has been observed experimentally that there is a biological limitation for the amplitude of the applied magnetic field (H) and the frequency (f). Various studies have demonstrated that the product of the amplitude of the magnetic field and of the frequency (H·f) must not exceed the threshold value of $5\times10^9$ A $m^{-1}$ $s^{-1}$ for the hyperthermia treatment to be considered safe for the human body. Many of the SAR values of magnetic nanoparticles reported in the literature are measured at frequencies between 500 and 700 kHz and fields between 10 and 20 kAm$^{-1}$, with consequent factors H·f that, in most cases, exceed the threshold value. Moreover, the lack of standard devices or of established measurement protocols contributes to increasing the variability of the SAR values measured up to now.

In recent years, attention has been focused on obtaining superparamagnetic nanoparticles smaller than 12-14 nm, and many protocols or treatments provided are based on particles of this size. Hergt et al. (Journal of Magnetism and Magnetic Materials 2005, 293, 80) presumed that high SAR values could be reached in the range of dimensional transition between superparamagnetic nanoparticles and ferromagnetic nanoparticles, which in the case of iron oxide nanocrystals (IONCs) is approx. 20 nm. Moreover, to obtain "injectable" nanoprobes, superparamagnetic nanoparticles should be preferred to ferromagnetic ones: absence of residual magnetization of these nanoparticles in the absence of the applied external magnetic field allows better dispersion and avoids the problems of aggregation that are typical of ferromagnetic materials.

At present, the available superparamagnetic nanoparticles have low SAR values. Moreover, a dramatic decrease in thermal power of superparamagnetic nanoparticles has been observed, once they are transported into cells or tissues. To overcome this limitation and to achieve a reasonable increase in temperature, studies were carried out in vitro in which higher doses and frequencies were used, but exceeding the safety limits by a factor H·f.

Among the various materials that have shown promising magnetic properties (high saturation magnetization, relatively high anisotropy constant $K_{eff}$ and a high initial magnetic susceptibility), iron oxide nanocrystals are by far the most studied, also owing to their biocompatibility and availability. These nanocrystals can in fact be prepared in large amounts with simple methods, such as sol-gel techniques or co-precipitation techniques, and have already been tested in preliminary clinical trials of hyperthermia.

It has been demonstrated, however, that nanocrystals prepared by these methods have the drawbacks described above (low SAR values in solution and a further decrease of these values when the particles have been or were localized to the biological tissue).

Moreover, the nanocrystals obtained with sol-gel or co-precipitation techniques exhibit high polydispersity, which in theory would compromise the heating power with a decrease in SAR value. In contrast, particles synthesized by methods of thermal decomposition have shown excellent magnetic properties, but even in these cases the magnetic behaviour is highly dependent on the method of synthesis employed and so is rather unreliable.

Detailed procedures for synthesis of colloidal ferrite nanocrystals have been amply described. In general, most of these procedures are based on the decomposition of precursor species in a solution containing various stabilizers (preferably organic surfactants) in particular reaction conditions. The species form the so-called "monomeric species", which then react, giving rise to nucleation and a growth phase of the nanocrystals. Organic stabilizers are fundamental for slowing the growth process, so that it can be controlled and for keeping the size of the crystals at the nanometric level. Moreover, the stabilizers, effectively coating the surface of the nanocrystals, prevent these from forming aggregates during growth. In some cases they can contribute to control of the shape of the nanocrystals.

The procedures described above make it possible to obtain almost monodisperse colloidal nanocrystals up to 15 nm in size. New methods have recently been reported with which it is possible to obtain iron oxide nanocrystals larger than 15 nm using "seed-mediated growth" synthesis, "one pot" synthesis, or chemical transformation of iron oxide of other phases. SAR values have recently been reported for sugar-coated iron oxide nanocrystals with size between 4 and 35 nm, synthesized with various colloidal methods. In particular, those prepared by thermal transformation of annealing of FeO nanoparticles to $Fe_2O_3$ nanoparticles showed the highest performance in hyperthermia. A recent work describes iron oxide nanocrystals ranging in size from 6 to 18 nm obtained by refining a "seed-mediated growth" technique with control of the polydispersity of the nanocrystals that is below 2%. However, these particles have low SAR values. In a more detailed magnetic and structural study, it was found that low hyperthermia performance may be a consequence of their magnetic core/shell structure, consisting of a magnetic core, with size corresponding to that of the starting seed, enveloped in a magnetically frustrated layer. The study suggested that this "seed-mediated growth" method might not be the most suitable if good hyperthermia performance is desired.

Various methods have been proposed in recent years for the synthesis of ferrite nanoparticles with increased control of shape. In these cases too, however, uniformity of shape is limited to just some size ranges of nanoparticles. Guardia P. et al. recently reported, in Chemical Communications 2010, 46, 6108, a synthesis for producing iron oxide nanocubes in a wide range of sizes. The method is able to overcome the aforementioned limits, reaching dimensions of nanoparticles up to 180 nm.

In the proposed technique, iron(III) acetylacetonate, decanoic acid and dibenzyl ether were mixed together and heated. Particle size can be controlled using an appropriate ratio of iron precursor to decanoic acid or by following suitable heating ramps. Even if the magnetic behaviour of these nanocubes makes them suitable for various applications, the proposed synthesis nevertheless has various drawbacks, such as non-uniformity of shape (in fact obtaining irregular cubes, spheres and multi-faceted particles together with the regular cubes), and a wide distribution of particle size of about 20% and up to 30%, which has a negative influence on hyperthermia performance. Moreover, the synthesis is poorly reproducible and the effective size of the final nanocrystals cannot be predicted. Finally, the nanocrystals obtained by the synthesis are soluble in non-polar solvents, thus making it difficult to use them in aqueous environments typical of biological systems.

SUMMARY OF THE INVENTION

The present invention is based on the discovery that the poor reproducibility of the synthesis described above is due to the use of dibenzyl ether at high temperatures: in fact, the ether group decomposes at high temperatures leading to formation of rejects with a consequent decrease in synthesis temperature. This results in a wide dimensional distribution of the particles, in terms of size and of shape. However, the ether is necessary in this synthesis: experiments carried out without its use demonstrated that cubes with dimensions above 15-18 nm and with high values of magnetization and SAR cannot be obtained. These experiments therefore suggest that iron oxide nanocrystals synthesized by this method are excellent candidates as heat mediators for hyperthermia applications. However, the proposed method of synthesis is barely applicable to production at industrial levels because of the problems of reproducibility described above.

Hyperthermia treatments are carried out in aqueous solution, and therefore require solubility of the iron oxide nanocrystals in polar solvents and stability in physiological conditions. However, the nanoparticles that can be obtained with the methods described are only soluble in organic solvents. Moreover, the methods for transfer of nanoparticles from non-polar environments to polar solutions developed to date require numerous steps, limiting their applicability in industrial production of ferrite nanocrystals soluble in polar media.

One aim of the present invention is to provide a new method for the industrial preparation of monodisperse ferrite nanocrystals having high SAR values in a wide range of sizes, which is reproducible and provides a high degree of control of shape and size of the nanoparticles.

Another aim of the invention is to provide a method allowing stable transfer of these nanocrystals from apolar solvents to polar solvents in a single process step.

Based on these aims, the object of the invention is a method of synthesis of ferrite nanocrystals, as defined in the claims given hereunder, which constitute an integral part of the present description.

The method according to the invention is based on the discovery that the combined use of at least two solvents in different groups, such as ethers and high-boiling aliphatic hydrocarbons (as defined below), leads to greater stabilization of temperature, allowing greater control of particle shape and size. This is presumably due to the higher boiling point of the aliphatic hydrocarbons relative to the ethers, making it possible to maintain a stable synthesis temperature.

BRIEF DESCRIPTION OF THE FIGURES

FIG. 8 shows the SAR values as a function of:

A) the frequency at the two magnetic field amplitudes of 14 kam$^{-1}$ (filled symbols) and 18 kam$^{-1}$ (open symbols) respectively for nanocrystals of dimensions equal to 12.5±1 nm (diamonds ◆, ◇), 19±3 nm (triangles ▲, △), 25±4 nm (circles ●, ○) and 38±9 nm (squares ■, □);

B) dimensions of nanocrystals for frequencies of 300 kHz (triangles ▲), 220 kHz (circles ●) and 109 kHz (squares ■) respectively;

C) amplitudes of the magnetic field applied at a frequency of 220 kHz;

D) product of frequency times the amplitude of the field, where the vertical line defines the limit allowed for medical application in safe conditions. For the plots in C) and D), the symbols correspond to nanocrystals of 14 nm (squares ■), 19 nm (triangles ▲) and 24 nm (circles ●). Each experimental point was calculated as the mean value of at least 4 measurements and the error bars indicate the mean deviation;

DETAILED DESCRIPTION

The method according to the invention relates to the synthesis of iron-based ferrite nanocrystals having controlled size and shape of the crystals, in particular with a narrow granulometric distribution in terms of shape and size. In particular, the term iron-containing ferrite applies to the production of nanocrystals of iron(II) and iron(III) oxides such as $Fe_2O_3$ and $Fe_3O_4$, while the term ferrite applies in this document to iron/cobalt or iron/manganese mixed oxides, such as in particular $MnFe_2O_4$ and $CoFe_2O_4$. All of these nanocrystals are characterized by an inverse spinel structure.

In particular, the method makes it possible to obtain crystals with a monodisperse granulometric distribution, a term that is used in the present description to indicate, preferably, a granulometric distribution with a standard deviation less than 20% and preferably less than or equal to 15%.

The method of synthesis is carried out by thermal decomposition of a precursor of the ferrite compound, in the presence of a ligand and a solvent, which are described below.

The term precursor refers to a chemical species containing at least one of the elements necessary for nucleation/growth of nanocrystals. Precursors that can be used are organic metal salts containing iron ($Fe^{2+}$ and $Fe^{3+}$), optionally mixed with organic metal salts containing $Mn^{2+}$, $Co^{2+}$, $Mn^{3+}$ or $Co^{3+}$, in the case of synthesis of ferrites consisting of mixed elements of the type mentioned above.

The preferred precursor for the synthesis of iron oxide nanocrystals is a salt of Fe(II) and Fe(III), where the iron is coordinated with aliphatic carboxylic acids, for example Fe(III) and Fe(II) acetylacetonate, Fe(III) and Fe(II) oleate, Fe(III) and Fe(II) laurate and Fe(III) and Fe(II) stearate. Other precursors that have been used industrially for production of iron-containing particles by thermolysis comprise iron pentacarbonyl, Fe(III) and Fe(II) acetate, Fe(III) and Fe(II) chlorides, Fe(III) and Fe(II) sulphates, Fe(III) and Fe(II) iodides, Fe(III) and Fe(II) bromides, Fe(III) and Fe(II) nitrates, iron perchlorates ($Fe(ClO_4)_3$), iron sulphamate, iron(II) trifluoroacetylacetonate, iron(III) trifluoroacetylacetonate disodium tetracarbonylferrate, ferrocene and derivatives thereof, diiron nonacarbonyl, iron dodecacarbonyl and Prussian blue, and these precursors can also be used in the synthesis according to the invention. The synthesis of ferrite compounds consisting of mixed elements envisages the use of mixtures of precursors containing iron and manganese or iron and cobalt.

Mn(III) and Mn(II) acetylacetonate, Mn(II) and Mn(III) oleate, Mn(II) and Mn(III) laurate, Mn(II) and Mn(III) stearate, manganese decacarbonyl, Mn(III) and Mn(II) acetate, Mn(II) chloride, Mn(III) and Mn(II) sulphates, Mn(II) iodide, Mn(II) bromide, Mn(III) and Mn(II) nitrates, manganese perchlorate ($Mn(ClO_4)_3$), manganese sulphamate ($Mn(NH_2SO_3)_2$), manganese(II) trifluoroacetylacetonate, manganese(III) trifluoroacetylacetonate, manganese(II) methoxide ($Mn(OMe)_2$) and manganese(II) carbonate ($MnCO_3$).

Co(II) acetylacetonate, Co(II) oleate, Co(II) laurate, Co(II) stearate, dicobalt(II) octacarbonyl ($Co_2(CO)_8$), Co(II) acetate, Co(II) chloride, Co(II) sulphate, Co(II) iodide, Co(II) bromide, Co(II) nitrate, cobalt sulphamate ($Co(NH_2SO_3)_2$) and cobalt(II) trifluoroacetylacetonate.

The synthesis is carried out in the presence of a ligand, with surfactant properties, able to form a complex with iron(III).

The preferred ligands comprise saturated and unsaturated aliphatic carboxylic acids preferably having from 10 to 18 carbon atoms and aliphatic amines, preferably $C_{10}$-$C_{18}$.

Carboxylic acids are preferred, in particular decanoic acid and saturated and unsaturated fatty acids, for example oleic acid. These ligands are commonly used in colloidal syntheses.

The use of various ligands, in particular aliphatic carboxylic acids, leads to the formation of different organic metal complexes with iron, which can behave in various ways, for example, decomposing at a different temperature and also creating differences in the kinetics of growth, leading to variation of shape and size in the same experimental conditions.

Figure 5:
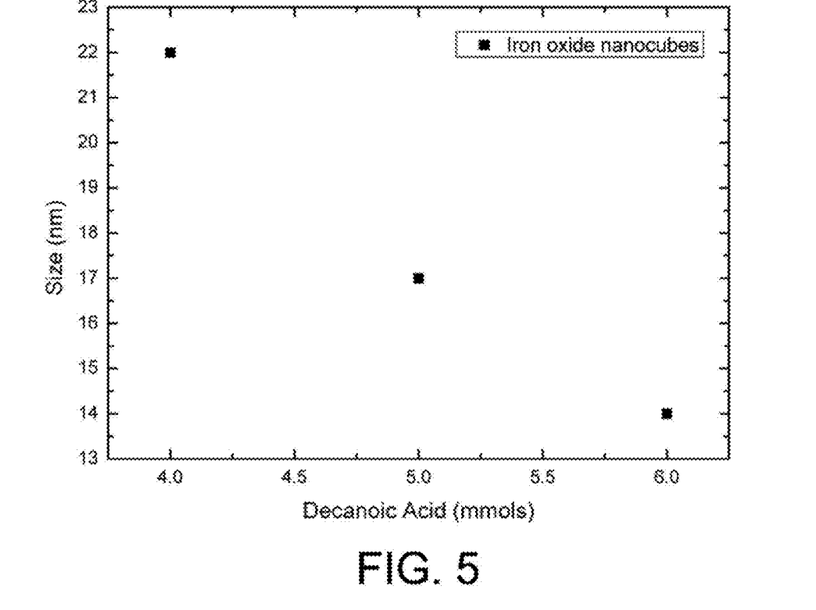
FIG. 5 shows the variation of the dimensions of iron oxide nanocubes synthesized using 15 ml of dibenzyl ether and 10 ml of squalane, as a function of the number of moles of decanoic acid relative to 1 mol of acetylacetonate precursor (see Table 2)
Figure 7:
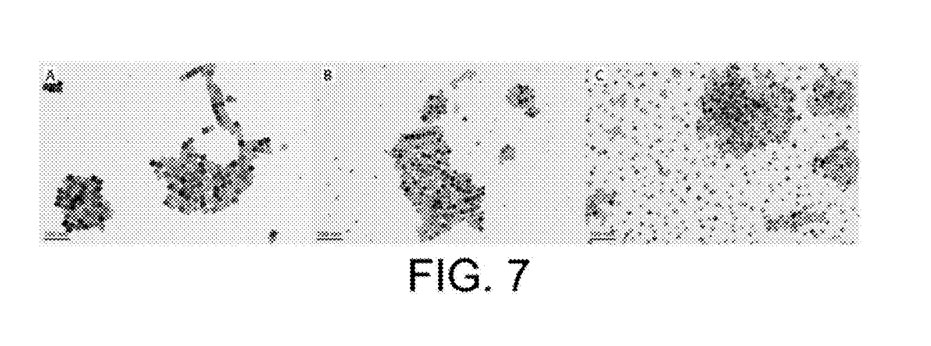
FIG. 7 shows TEM images of iron oxide nanocubes of: A) 22 nm, B) 17 nm and C) 14 nm synthesized using different molar amounts of decanoic acid: a) 4 mmol, B) 5 mmol and C) 6 mmol relative to 1 nmol of Fe(III) acetylacetonate (see Table 2)

In experiments relating to the invention, it was found that the molar ratio between iron or iron-containing precursor and ligand has an influence on the size of the nanocrystals. Precursor/ligand molar ratios between 1:3 and 1:7 are preferred, and the value 1:4 is especially preferred. The diagram in FIG. 5 shows the variation in the size of iron oxide nanocubes, in a preferred synthesis according to the invention, on varying the molar ratio of decanoic acid to acetylacetonate, where the variation is kept in the preferred range of ratios between 4:1 and 6:1; it can be seen that increase of the aforementioned ratio leads to a reduction in the average size of the crystals which, in the range of ratios investigated and in the test conditions, is maintained between 14 and 22 nm. FIG. 7 illustrates the nanocrystals obtained in the specific syntheses as in the diagram in FIG. 5.

According to the invention, the method of synthesis is carried out in the presence of a mixture of solvents comprising at least one organic ether and an aliphatic hydrocarbon.

The ethereal solvent is preferably an ether formed from aromatic or aliphatic radicals or a polyether, preferably having a boiling point above 245° C. The use of dibenzyl ether and diphenyl ether is preferred. The use of dibenzyl ether is particularly preferred in combination with decanoic acid as ligand, and acetylacetonate as precursor.

The high-boiling aliphatic compound comprises linear or branched, saturated or unsaturated aliphatic hydrocarbons, which must be liquid above 45° C. and preferably at room temperature and which moreover have a boiling point above the boiling point of the ethereal solvent used in the synthesis. In general, aliphatic compounds having from 18 to 36 carbon atoms can be used. For the production of nanocrystals intended to be used in hyperthermia applications, and water-soluble (colloidal solution), it is preferable to use a saturated aliphatic solvent, in particular squalane. The use of high-boiling unsaturated aliphatic solvents, having the aforementioned characteristics, can lead to the formation of a gel in which the synthesized nanocrystals are dispersed, owing to processes of polymerization of the solvent, from which it is difficult to extract the nanocrystals for the use mentioned above. However, obtaining nanocrystals dispersed in a gel is not to be excluded according to the invention. Thus, it is also possible to use high-boiling unsaturated aliphatic solvents, for example squalene and octadecene.

Modulation of the ratio of the two solvents makes it possible to obtain nanocrystals in a wide range of sizes. In general, the larger the amount of ether relative to the high-boiling aliphatic compound, the smaller the average size of the nanocrystals synthesized. In the experiments that were carried out, the use of different ratios between the two solvents made it possible to obtain particles ranging in size from 11 nm to 100 nm, as described in the examples given below. Crystals smaller than 70 nm have a regular cubic shape, whereas an octahedral shape is observed for larger sizes, as shown in FIGS. 2 and 3 and in Table 1.

It was observed that on increasing the ratio by volume between ether and the aliphatic compound, a wider granulometric distribution is obtained, as well as poor reproducibility. For this reason it is preferable to work with ratios by volume between ether and aliphatic hydrocarbon below 80%.

In molar terms, molar concentrations in the reaction mixture of ether (particularly dibenzyl ether) not above 5 M are preferred, because with higher molar concentrations, wider distributions of granulometry and of shape are observed, and the reproducibility of the method of synthesis is reduced. Similarly, molar concentrations of high-boiling aliphatic hydrocarbon below 1.5 M are preferred, particularly as in some tests it was observed that for higher concentrations the shape of the particles changes from cubic to become similar to a cube-octahedron or to an octahedron.

Figure 1:
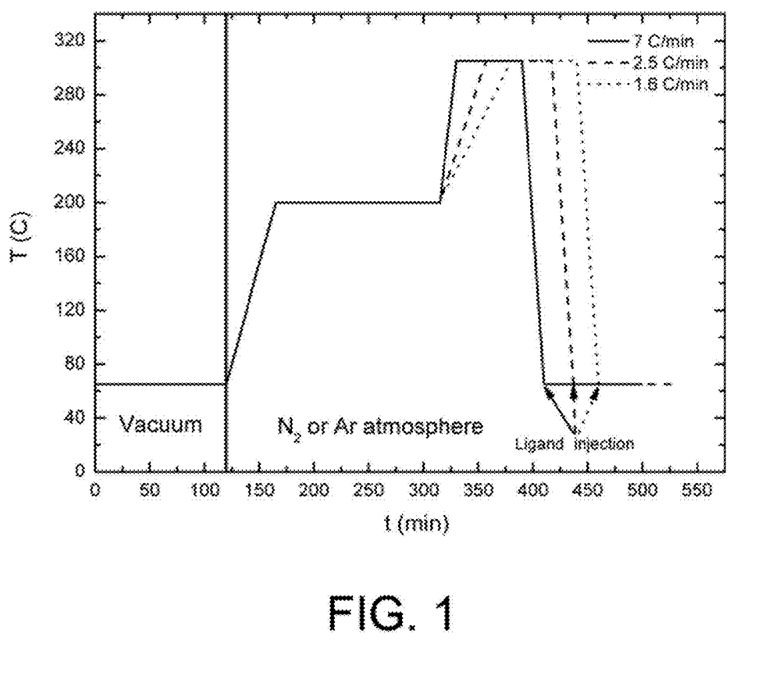
FIG. 1 shows, as an example, three separate diagrams of temperature as a function of time, applicable to the method according to the invention, which, depending on the temperature ramp, lead to different sizes of Fe oxide nanocrystals (31 nm, 7° C./min; 28 nm, 2.5° C./min and 22 nm, 1.6° C./min)
Figure 2:
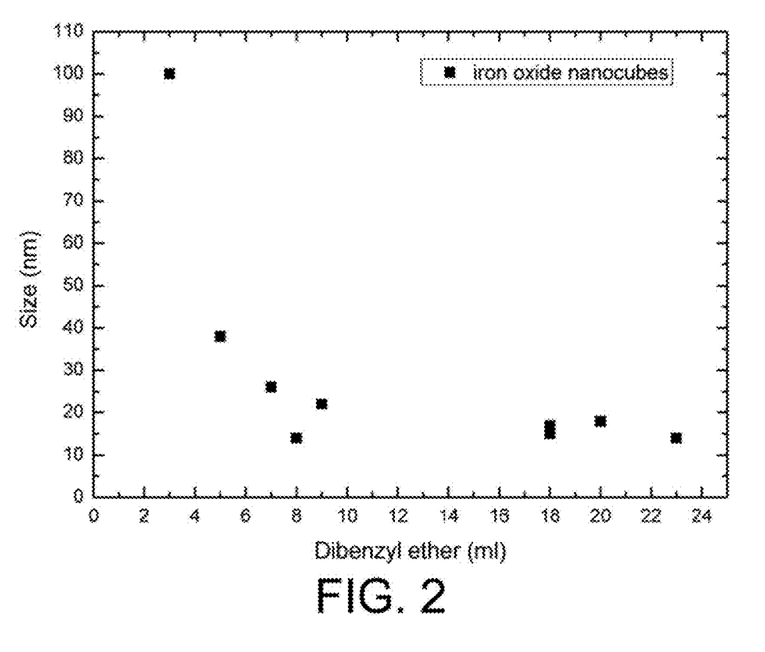
FIG. 2 shows the variation of the dimensions of iron oxide nanocubes in the conditions described in Table 1 as a function of the amount of dibenzyl ether relative to 25 ml of total solvent (dibenzyl ether and squalane)
Figure 3:
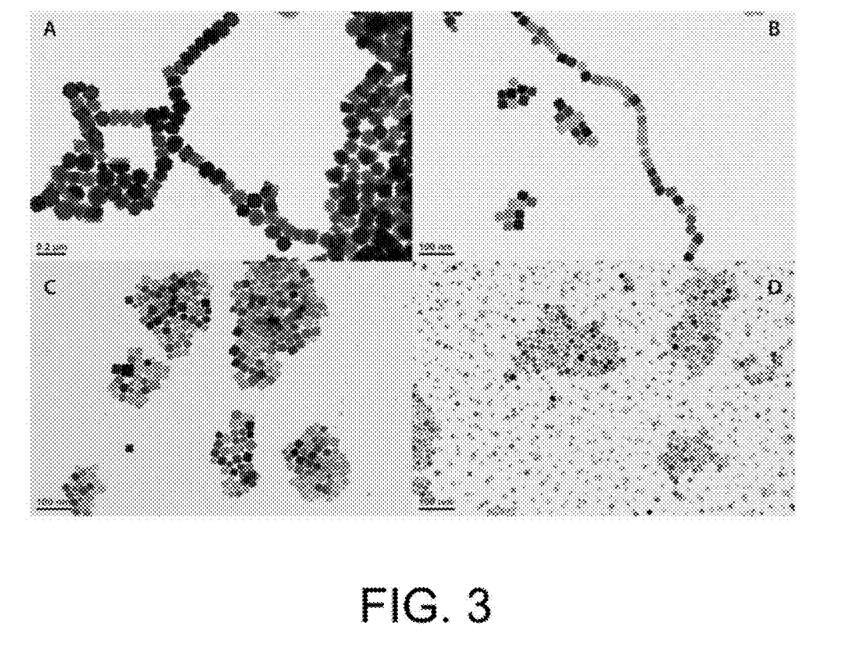
FIG. 3 shows representative images obtained in electron microscopy of iron oxide nanocubes of: A) 100 nm, B) 26 nm, C) 21 nm and D) 14 nm using in the synthesis A) 3 ml, B) 7 ml, C) 9 ml and D) 23 ml of dibenzyl ether per 25 ml of total solvent (see Table 1)

In the method according to the invention, process conditions and reaction parameters are generally preferred that result in obtaining crystals smaller than 70 nm and preferably larger than 15 nm, because in this size range, crystals of regular cubic shape are obtained, whereas an octahedral shape was observed for larger sizes, as shown in FIGS. 2 and 3 and in Table 1.

The method of synthesis of colloidal ferrite nanocrystals is carried out by heating the mixture of precursor(s), ligand(s) and organic solvents to a temperature sufficient to cause formation of the nanocrystals; typically, this temperature can be between 240° C. and 350° C. and must be sufficient to cause thermal decomposition of the complex generated from the precursor by complexation with the ligand. Typically, heating is carried out at a final temperature that corresponds to the reflux temperature (at atmospheric pressure) of the reaction mixture.

In a preferred embodiment, as a result of mixing the aforementioned components, which can be carried out at room temperature, the method comprises an initial step of degassing the solution, carried out at subatmospheric pressure, for example below 500 mTor; the degassing step is preferably carried out while maintaining the mixture under vacuum at a temperature below 120° C. and preferably between 60 and 70° C., for a time preferably greater than 10 minutes, for example between 1 and 3 hours; in all cases, the degassing operation is carried out in conditions of temperature, pressure and time sufficient to cause the removal of impurities and undesirable volatile products, which can have an influence on the nucleation of the crystals.

In a preferred embodiment, synthesis of the crystals is carried out applying heating conditions suitable for separating the nucleation phase from the growth phase of the crystals.

For this purpose, following the degassing step, the solution is preferably heated (under inert atmosphere of $N_2$ or Ar) to an intermediate temperature between the degassing temperature and the reflux temperature of the solution and is held at this temperature for a predetermined time, greater than 10 minutes and up to 5 hours, for example between one and two hours. Preferably, the aforementioned intermediate temperature is below 240° C., and preferably between 190 and 210° C. However, the aforementioned step is optional. The final step of the method, which leads to formation and growth of the nanocrystals, is carried out by heating the solution, from the degassing temperature or from the aforementioned intermediate temperature, preferably up to the reflux temperature of the solution. The temperature ramp applied in this step is important, not only for obtaining high reproducibility of the synthesis, but also for controlling the size of the nanocrystals.

Figure 4:
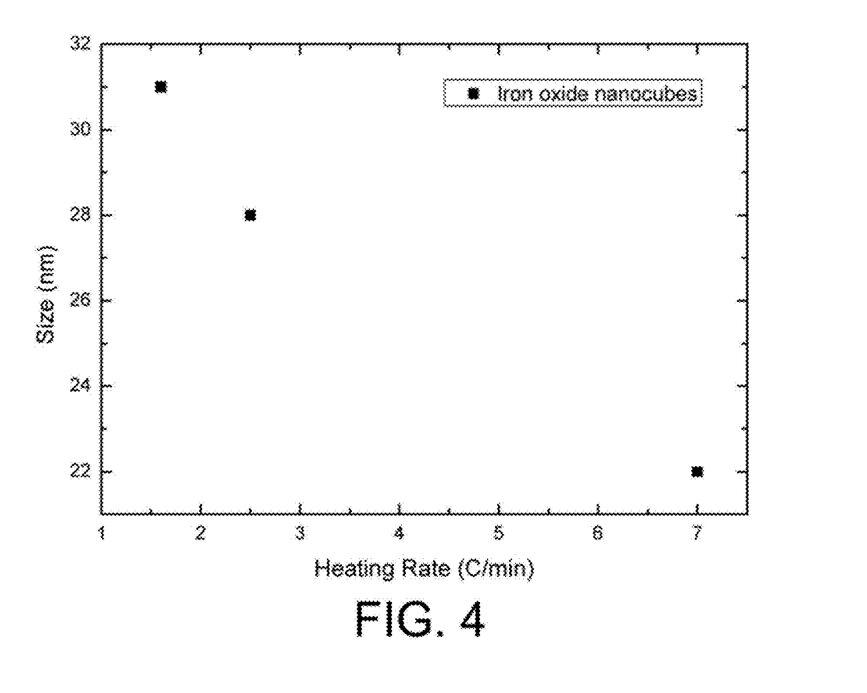
FIG. 4 shows the variation of the dimensions, as a function of the heating rate, of iron oxide nanocubes synthesized using 15 ml of dibenzyl ether and 10 ml of squalane, keeping the other synthesis parameters unchanged (see Table 2)
Figure 6:
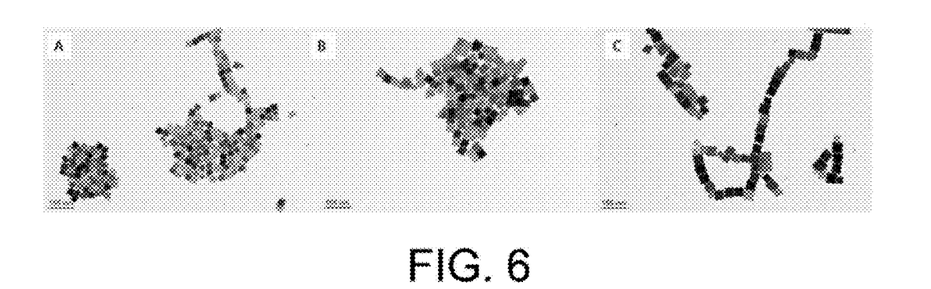
FIG. 6 shows images obtained in transmission electron microscopy (TEM) of iron oxide nanocubes of: A) 22 nm, B) 28 nm and C) 31 nm synthesized using a heating rate of: A) 7° C./min, B) 2.5° C./min and C) 1.6° C./min (see Table 2)

As a general trend, the greater the thermal gradient to reach the reflux temperature, the smaller the final size of the nanocrystals. For obtaining monodisperse granulometric distributions, in terms of size and shape, it is preferable to work with thermal gradients, preferably constant, between 1° C./min to 7° C./min. FIG. 4 shows the variation in size of the crystals as a function of the thermal gradient, in the synthesis conditions given in Table 2. FIG. 6 shows the corresponding crystals thus obtained.

Typically, in the solution, the final phase of growth of the crystals is maintained at the reflux temperature for times of the order of 45 min and up to 2 hours. After cooling to room temperature, the nanocrystals obtained can be separated from the reaction solution, for example by adding a solvent such as acetone and centrifugation to cause precipitation of the nanocrystals, followed by optional washing operations.

Structural and morphological characterization of the crystalline structures thus obtained can be carried out by transmission electron microscopy (TEM) and X-ray diffraction (XRD). Analysis by TEM, carried out on a large number of nanocrystals, provides a statistical estimate of their average size. In all the tests carried out, working within the parameters of the invention described above, a standard deviation in the curve of granulometric distribution of less than 15% was obtained. In the samples analysed, all the nanocrystals had a cubic form (FIG. 3).

In a preferred embodiment, the iron-based ferrite nanocrystals, obtained as a result of the synthesis, were transferred from the non-polar solvents for synthesis to polar solvents, using a ligand exchange technique. Selection of a suitable ligand to be injected preferably in the post-reflux cooling step and more preferably when the temperature reaches values below 120° C., between 70-90° C., makes it possible to perform ligand exchange without a preceding step of extraction of the nanocrystals from the reaction mixture and preliminary purification, thus reducing the number of process steps required.

Ligand molecules suitable for carrying out the exchange procedure for ferrite nanocrystals require an anchoring group that is able to bind to the surface covalently, or by various types of interaction, for example electrostatic. This bond should generally be strong enough so as to permit substitution of the ligand molecules with the molecules of surfactant (for example the alkyl carboxylic acids or alkyl amines present during the synthesis). Chemical groups such as phosphonates, catechol and derivatives thereof, and carboxylic acids are preferred. Binding to the surface of the nanocrystals takes place in particular by means of one or more chemical groups containing oxygen, such as hydroxyl or carboxyl groups. The binding affinity, and the stability of the resultant product, depend on the nature of the binding group, as well as on the reaction conditions. Both factors can be adapted according to the specific applications for which the nanocrystals are intended.

The ligand molecule must moreover possess a "tail" suitably selected for imparting a certain steric character and/or electrostatic stabilization of the nanocrystal. If it is desired to obtain particles that are soluble in non-polar solvents, usually it is preferable to use aliphatic "tails" made up of numerous repeating units. If, however, solubility in polar and/or aqueous solutions is desired, the "tail" of the ligand should be readily soluble in these solvents. The commonest chemical compound for obtaining solubility in polar media is polyethylene glycol (PEG), which is particularly preferred for its availability on the market, low cost and intrinsic properties such as solubility in water, biocompatibility and low binding affinity with proteins. The use of PEG having from 10 to 200 repeating units is preferred.

Figure 9:
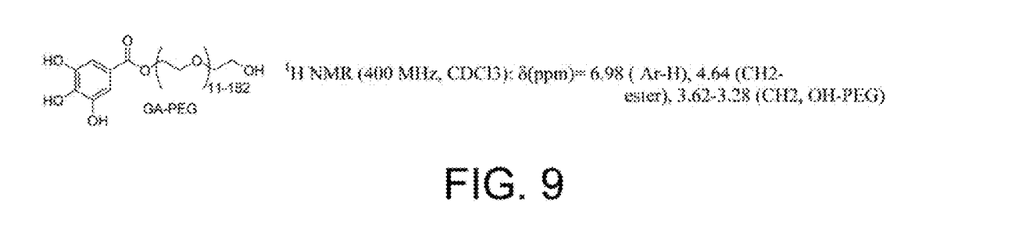
FIG. 9 is a schematic representation of the structure of GA-PEG (1.5 kDa) showing the corresponding $^1$H-NMR signals (400 MHz, CDCl$_3$)
Figure 10:
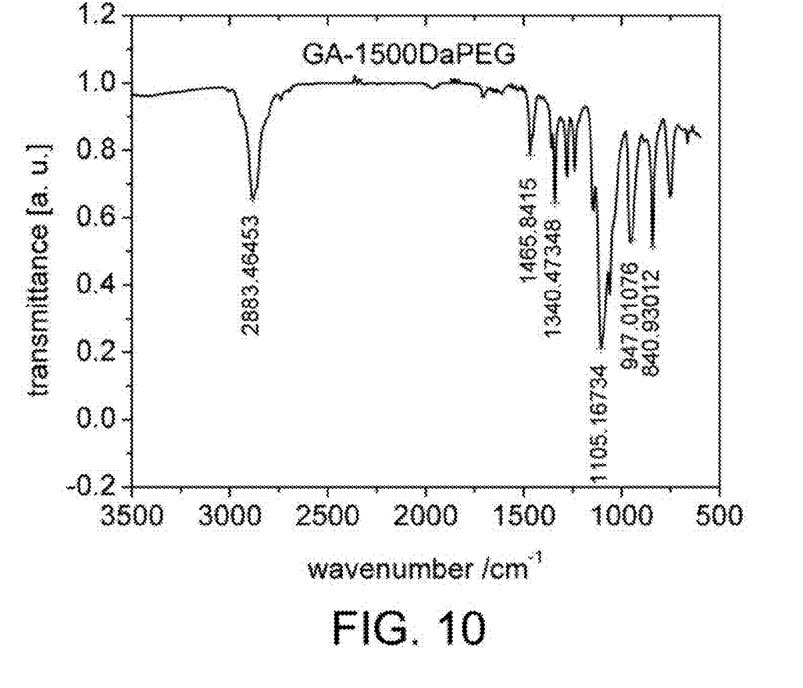
FIG. 10 is an FTIR spectrum of GA-PEG (Mw, PEG=1500 Da). An aqueous solution of 22 nm$^3$ comprising molecules of GA-PEG as surfactants was deposited on a silicon substrate and the spectrum was recorded in transmission mode.
Figure 11:
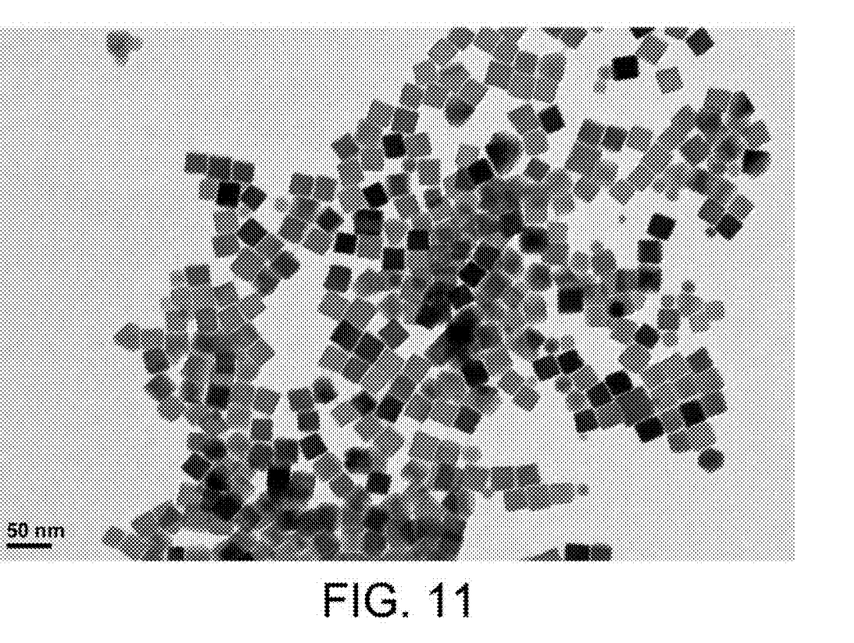
FIG. 11 shows a typical TEM image of a purified sample of 22 nm nanocubes with the GA-PEG ligands.
Figure 12:
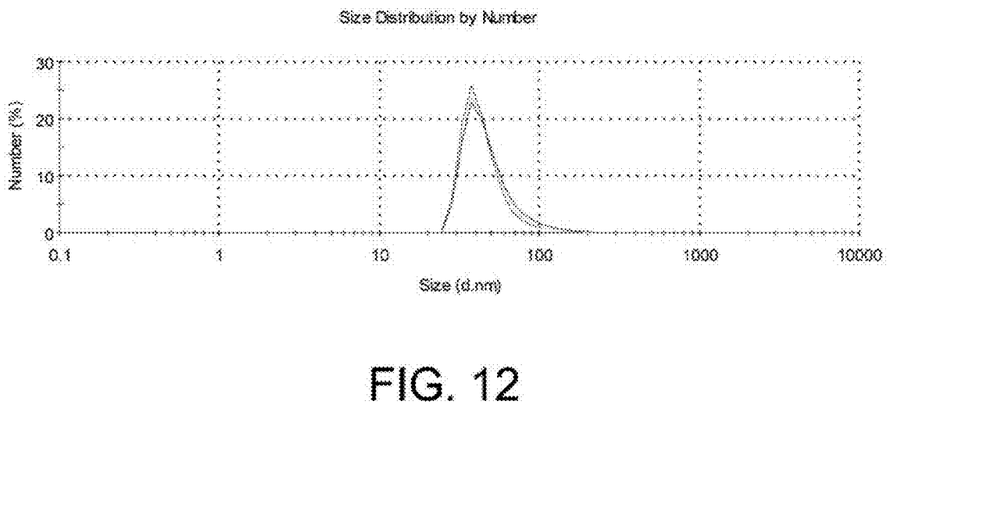
FIG. 12 is a DLS graph of a sample of 22 nm nanocubes with the GA-PEG ligands in deionized water.
Figure 13:
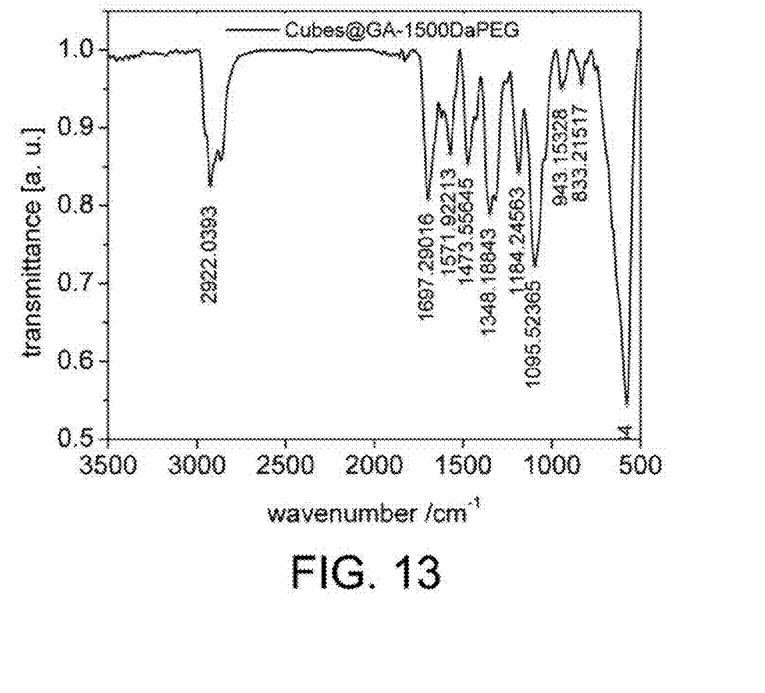
FIG. 13 is an FTIR spectrum of a purified sample of 22 nm nanocubes with the GA-PEG ligands. An aqueous solution of sample was deposited on a silicon substrate and the spectrum was recorded in transmission mode.
Figure 14:
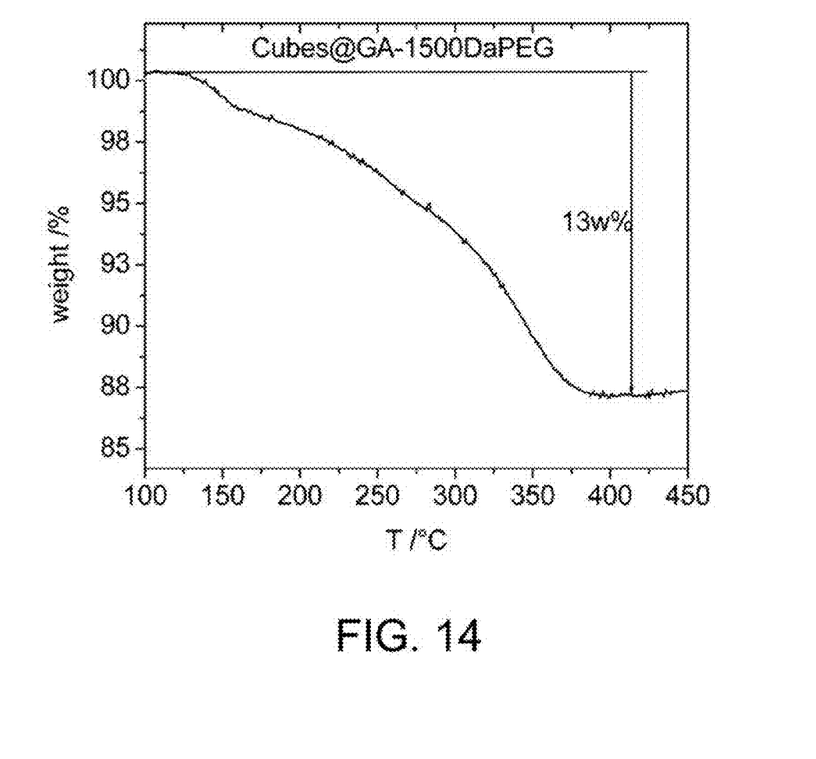
FIG. 14 shows a TGA analysis: a dried sample of 22 nm cubes with GA-PEG ligands was heated under nitrogen atmosphere and the weight loss, which corresponds to the organic component of the material, was recorded as a function of temperature.
Figure 15:
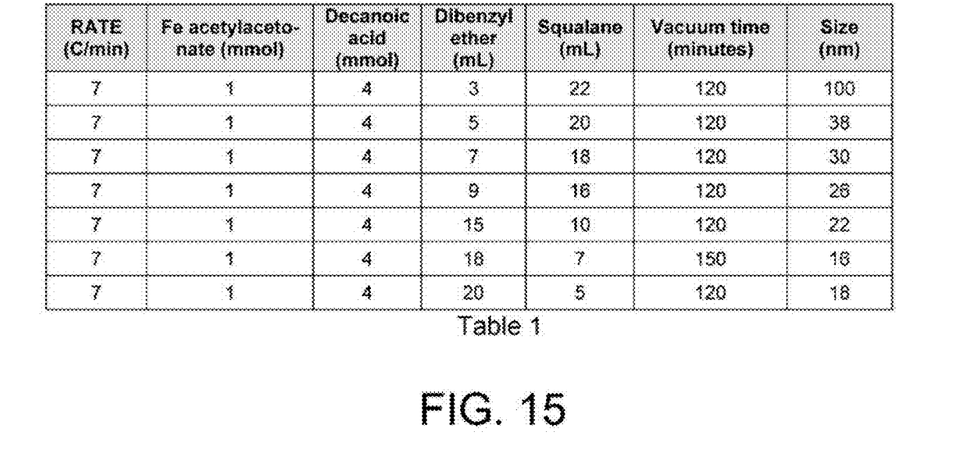
FIG. 15 (Table 1) is a synoptic table presenting the various conditions of synthesis of iron oxide nanocrystals using different ratios of dibenzyl ether to squalane.
Figure 16:
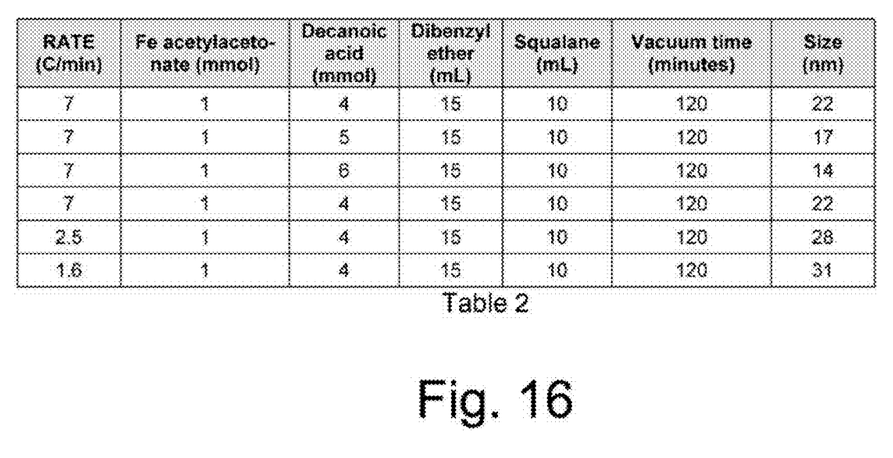
FIG. 16 (Table 2) is a synoptic table presenting the various conditions of synthesis for iron oxide nanocrystals using different heating rates or different amounts of decanoic acid.

For synthesis of the ligand, various reaction schemes are envisaged based on the chemical structure of the tail and the anchoring group, including amidation, click-chemistry, C—C cross-coupling and esterification. In a particular embodiment of the invention, the GA-PEG molecule (FIG. 9) was synthesized by esterification of poly(ethylene glycol), which functions as the tail, with gallic acid, which represents the anchoring group, using N,N'-dicyclohexylcarbodiimide as cross-coupling agent and dimethylaminopyridine as catalyst. An FTIR spectrum of GA-PEG is shown in FIG. 10.

For substituting the ligands used during formation and growth of the nanocrystals, the latter can preferably be purified from the by-products of the reaction and from the excess of ligand molecules. On mixing the purified nanocrystals with the new ligand molecules in suitable solvents and experimental conditions, the ligand exchange reaction takes place.

The final product must be purified from the excess of the new ligand molecules before being used for the application or for further functionalization.

In a particular embodiment of the invention, the GA-PEG ligand molecules, dissolved in a moderately polar solvent, e.g. chloroform ($CHCl_3$), are injected (in deprotonated form) together with a base, e.g. triethylamine, into the reactor containing the nanocrystals at temperatures below the decomposition temperature of GA-PEG, at the end of the synthesis process. The ligand exchange reaction takes place in situ and the nanocrystals that have molecules of GA-PEG on their surface can be extracted with water and finally purified of the excess GA-PEG by dialysis, ultracentrifugation or extraction with suitable organic solvents.

Further features and advantages of the method according to the invention will become clear from the practical examples presented below.

EXAMPLES

Example 1

Synthesis of Iron Oxide Nanocrystals of 100 Nm 0.353 g (1 mmol) of iron(III) acetylacetonate is mixed with 0.69 g (4 mmol) of decanoic acid in 22 mL of squalane and 3 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 3A).

Example 2

Synthesis of Iron Oxide Nanocrystals of 26 Nm 0.353 g (1 mmol) of iron(III) acetylacetonate is mixed with 0.69 g (4 mmol) of decanoic acid in 18 mL of squalane and 7 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 3B).

Example 3

Synthesis of Iron Oxide Nanocrystals of 21 Nm 0.353 g (1 mmol) of iron(III) acetylacetonate is mixed with 0.69 g (4 mmol) of decanoic acid in 16 mL of squalane and 9 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 3C).

Example 4

Synthesis of Iron Oxide Nanocrystals of 14 Nm 0.353 g (1 mmol) of iron(III) acetylacetonate is mixed with 0.69 g (4 mmol) of decanoic acid in 7 mL of squalane and 18 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 3D).

Example 5

Synthesis of Iron Oxide Nanocrystals of 22 Nm 0.353 g (1 mmol) of iron(III) acetylacetonate is mixed with 0.69 g (4 mmol) of decanoic acid in 10 mL of squalane and 15 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 6A or 7A).

Example 6

Synthesis of Iron Oxide Nanocrystals of 17 Nm 0.353 g (1 mmol) of iron(III) acetylacetonate is mixed with 0.86 g (5 mmol) of decanoic acid in 10 mL of squalane and 15 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 7B).

Example 7

Synthesis of Iron Oxide Nanocrystals of 14 Nm 0.353 g (1 mmol) of iron(III) acetylacetonate is mixed with 1.03 g (6 mmol) of decanoic acid in 10 mL of squalane and 15 ml of dibenzyl ether. After degassing for 120 minutes at 65° C., the mixture was heated to 200° C. (3° C./min) and maintained at this value for 2.5 h. Finally, the temperature was increased at a heating rate of 7° C./min up to reflux and was maintained at this value for 1 h (FIG. 7C).

Example 8

Synthesis of Iron Oxide Nanocrystals of 28 Nm 0.353 g (1 mmol) of iron(III) acetylacetonate is mixed with 0.69 g (4 mmol) of decanoic acid in 10 mL of squalane and 15 ml of dibenzyl ether. After degassing for 120 minutes at 65° C., the mixture was heated to 200° C. (3° C./min) and maintained at this value for 2.5 h. Finally, the temperature was increased at a heating rate of 2.5° C./min up to reflux and was maintained at this value for 1 h (FIG. 6B).

Example 9

Synthesis of Iron Oxide Nanocrystals of 31 Nm 0.353 g (1 mmol) of iron(III) acetylacetonate is mixed with 0.69 g (4 mmol) of decanoic acid in 10 mL of squalane and 15 ml of dibenzyl ether. After degassing for 120 minutes at 65° C., the mixture was heated to 200° C. (3° C./min) and maintained at this value for 2.5 h. Finally, the temperature was increased at a heating rate of 1.6° C./min up to reflux and was maintained at this value for 1 h (FIG. 6C).

Example 10

Synthesis of GA-PEG 7.5 g of poly(ethylene glycol) (PEG, 5 mmol, Mw=1500 kDa) in 500 mL of tetrahydrofuran (THF) stirred in a round-bottomed flask is mixed with 850 mg of gallic acid (GA, 5 mmol) dissolved in 200 mL of THF and 60 mg of dimethylaminopyridine (DMAP, 0.5 mmol) dissolved in 20 mL of THF. The mixture obtained is stirred at room temperature. The flask in which the synthesis reaction takes place is equipped with a separating funnel containing 5.2 g of N,N'-dicyclohexylcarbodiimide (DCC, 25 mmol) dissolved in 50 mL of THF, which is added dropwise over 1 h to a solution of PEG/GA/DMAP. The mixture is stirred at room temperature for 16 hours and THF and DMAP are removed under reduced pressure. The crude product GA-PEG is dissolved in 200 mL of deionized water and the pH is adjusted to 2 for precipitating hydrolysed DCC. After 1 h, the solution is filtered with filter paper and GA-PEG is extracted from the aqueous phase 3 times with 200 mL of chloroform. After removal of the chloroform, GA-PEG is dried under high vacuum for 5 hours before determining the yield, which is about 70%. A 0.1M solution of GA-PEG in chloroform was prepared and used for injection of the synthesis solution.

Example 11

Transfer of Iron Oxide Nanocrystals of 22 Nm in Polar Solvents 15 ml of solution of GA-PEG (0.1 M in chloroform) containing 1 ml of triethylamine is injected into the reaction mixture (Example 3) at 60° C. and the mixture is stirred for one hour at constant temperature. The mixture is left to cool to room temperature and is transferred to a separating funnel 10 mL of deionized water are added, forming two phases. After emulsifying by shaking, the phases can be separated, and the aqueous phase containing the iron oxide nanocrystals bearing GA-PEG is collected. This step is repeated until all the nanocrystals are transferred to the water. After concentration under reduced pressure at 40° C., the excess GA-PEG is removed by dialysis against deionized water. The solution containing the nanocrystals is concentrated CN by centrifugation by means of a centrifuge filter, with a molecular cut-off of 100 kDa, and is analysed by FTIR spectroscopy, DLS, TEM and TGA.

The ferrite nanocrystals obtained by the method according to the invention are found to have high SAR values, making them particularly useful in biomedical applications as heat mediators, as contrast agents for MRI and as agents for administration of drugs in drug delivery systems. Moreover, these nanocrystals can also be used in other sectors of technology, for example in the field of polymers as a local source of heat for forming new compounds.

The magnetic properties of the nanocrystals were characterized using MPMS-squid. For the samples, hysteresis cycles were measured at different temperatures (5 K and 300 K) and Zero Field Cooled-Field Cooled (ZFC-FC) curves were measured for the samples. The magnetic properties for the iron-based ferrites obtained, particularly the values of saturation magnetization and thus also the coercive fields, displayed behaviour almost independent of the dimensions. Moreover, the values measured were close to those reported for the bulk material.

The magnetic properties of the nanocrystals obtained according to the invention are illustrated with reference to a specific example of nanocrystals, consisting of iron oxide. In a specific embodiment, the magnetic properties were measured for iron oxide nanocrystals of 14 nm, 19 nm and 32 nm. The samples show similar behaviour to the bulk, with saturation values above 80 emu/g and coercive fields below 350 Oe.

Figure 8:
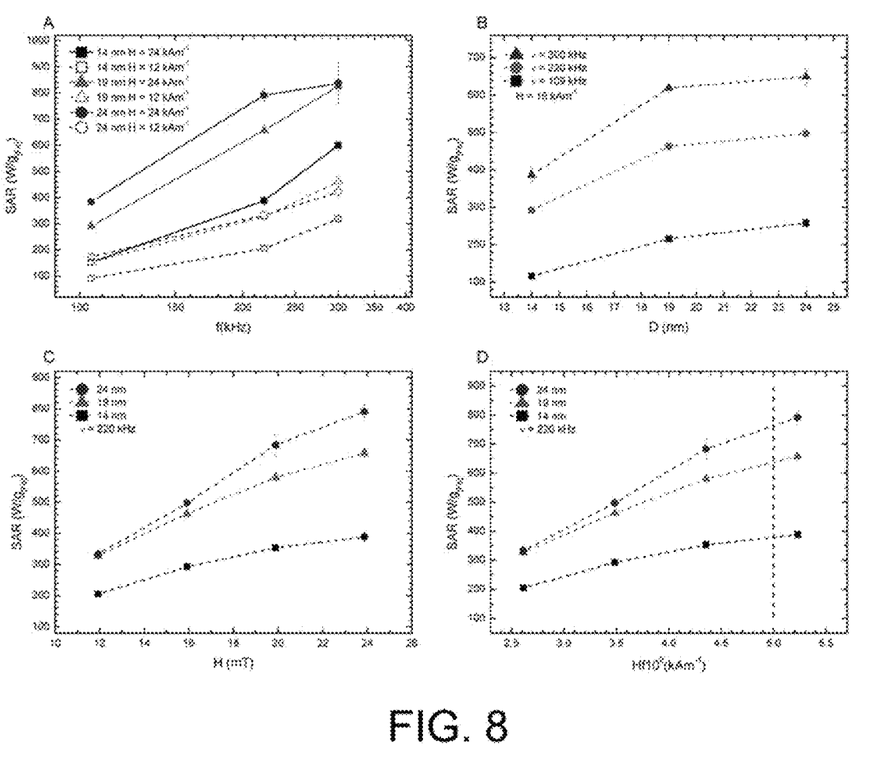
Figure 17:
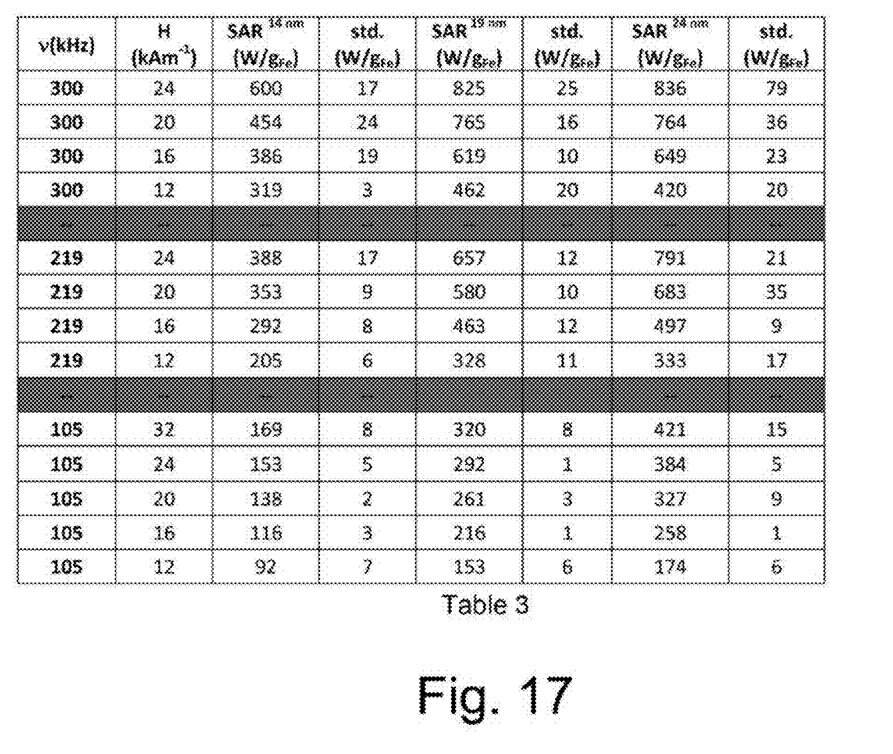
FIG. 17 (Table 3) presents a synopsis of the various SAR values and their standard deviation (std) at different frequencies and magnetic field amplitudes.

SAR values were measured at various fields and frequencies. A solution of iron nanocrystals with a suitable concentration was exposed to an oscillating magnetic field, the amplitude and frequency of which can be controlled. In this context, the nanocrystals that constitute the best "heat mediators" (a term indicating the capacity of a given material to produce heat when interacting with an external source) are those that have the highest value of SAR at the lowest value of the H.f factor. The results are presented in FIG. 17 (Table 3) and FIG. 8.

The invention claimed is:

1. A method of making iron-based ferrite nanocrystals comprising
    selecting one or more iron-based ferrite precursors
    heating a solution consisting essentially of said one or more precursors, a ligand, and at least two organic solvents to a temperature sufficient to cause thermal decomposition of said one or more precursors,
    wherein the iron-based ferrite is selected from the group consisting of iron oxides, mixed oxides of iron/cobalt, iron/manganese and any combination thereof,
    wherein the ligand is selected from the group consisting of: saturated or unsaturated aliphatic acids and aliphatic amines, and
    wherein one of the at least two organic solvents comprises an ether and another of the at least two organic solvents comprises a linear or branched saturated aliphatic hydrocarbon having from 18 to 36 carbon atoms, said saturated aliphatic solvent being liquid at room temperature and having a boiling point above 298° C. and higher than the boiling point of the ether solvent.

2. The method of claim 1, wherein the aliphatic hydrocarbon comprises squalane.

3. The method of claim 1, wherein at least one of the two solvents is diphenyl ether or dibenzyl ether and wherein the volume ratio between said solvent of ether and said aliphatic hydrocarbon is less than 80%.

4. The method of claim 1, wherein the ligand is selected from the group consisting of a carboxylic acid and an aliphatic amine having an aliphatic chain from 10 to 18 carbon atoms.

5. The method of claim 1, wherein the ligand comprises oleic acid or decanoic acid.

6. The method of claim 1, wherein the precursor comprises Fe(III) acetylacetonate.

7. The method of claim 1, wherein the molar ratio of precursor to ligand is between 1:3 and 1:7.

8. The method of claim 1 comprising an initial step of degassing at subatmospheric pressure at a temperature lower than 120° C.

9. The method of claim 1, wherein heating is carried out at the reflux temperature of the solution.

10. The method of claim 8, wherein said degassing step is followed by a heating step at an intermediate temperature lower than 240° C., after which said temperature is maintained for a time between about 10 minutes and about 5 hours, and wherein the solution is heated in a final step to the reflux temperature, at atmospheric pressure.

11. The method of claim 10, wherein the heating of said solution, from the intermediate temperature to the reflux temperature, is performed by applying a thermal gradient of constant heating between 1° C./min and 7° C./min.

12. The method of claim 1 wherein the nanocrystals obtained by said method are transferred in an aqueous solution by a ligand exchange process comprising introducing into the solution, a ligand comprising a di- or multihydroxy head group for anchoring to the nanocrystal and a polyoxyalkylene tail soluble in polar solvents to be injected during a post-reflux cooling phase when the temperature reaches values lower than 120° C.

13. The method of claim 12, wherein the ligand used in the ligand exchange process is a compound derived from gallic acid, connected to a chain of polyethylene glycol via a covalent ester bond.

* * * * *